Sept. 29, 1931.  C. KELLER  1,825,072
HAMMERING TOOL
Filed Feb. 25, 1930
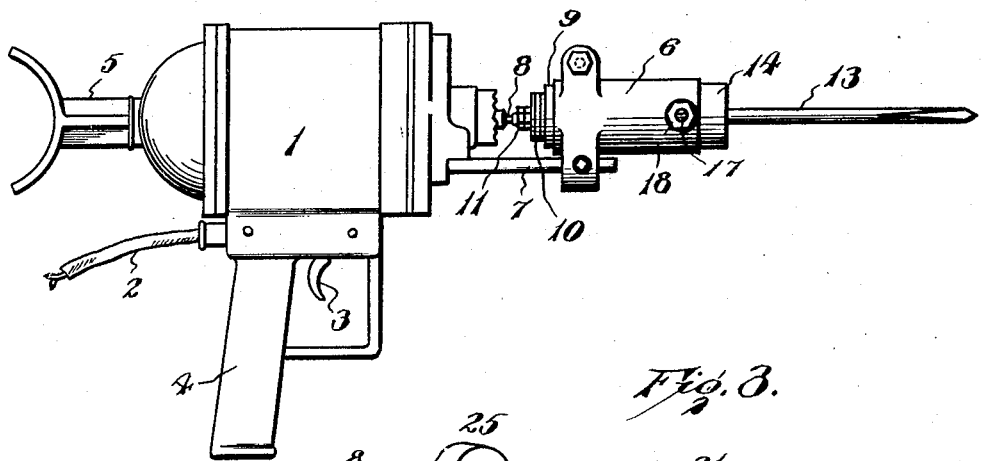
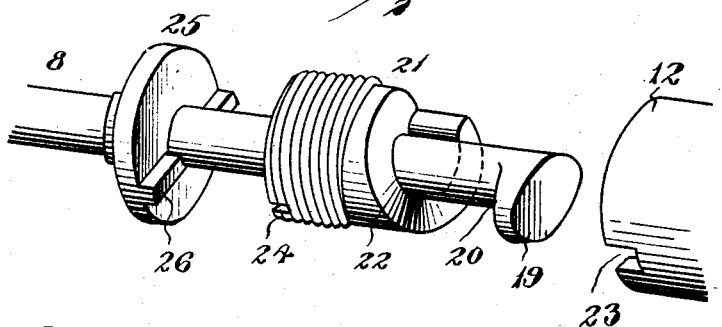
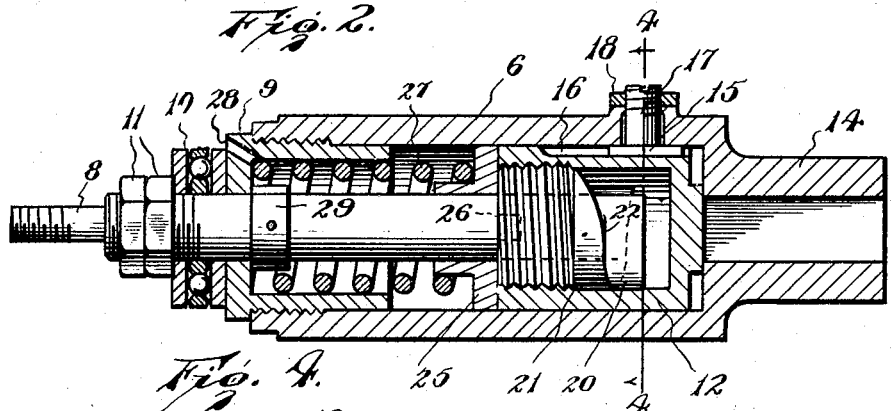
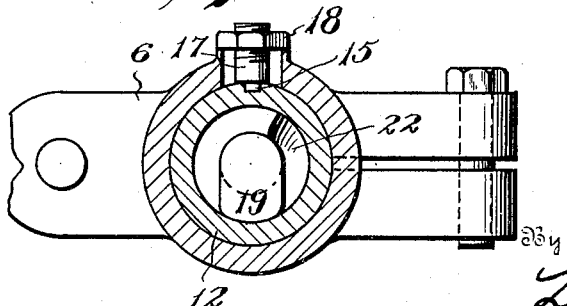
Inventor
Charles Keller
By Lacey & Lacey, Attorney Patented Sept. 29, 1931

1,825,072

UNITED STATES PATENT OFFICE

CHARLES KELLER, OF EAU CLAIRE, WISCONSIN

HAMMERING TOOL

Application filed February 25, 1930. Serial No. 431,190.

This invention relates to percussion tools and its object is to provide a simple compact tool which will operate easily and efficiently. The invention is illustrated in the accompanying drawings and will be hereinafter fully set forth.

In the drawings:

Figure 1 is a side elevation of a complete tool embodying the invention,

Fig. 2 is a longitudinal section through the casing or chuck,

Fig. 3 is a perspective view of the driving shaft and the cam elements immediately associated therewith, and Fig. 4 is a transverse section on the line 4—4 of Fig. 2.

Referring to the drawings more particularly by numerals, the reference numeral 1 indicates a motor casing in which is mounted an electric motor to which current is supplied through a cable 2, the motor being controlled through mechanism connected with a trigger 3 in the usual manner. The motor casing is supported by arms 4 and 5 depending from the bottom of the casing and extending rearwardly from one end thereof, as shown. Disposed in front of the motor casing is a chuck or tool casing 6 to one side of which is secured a stop pin or rod 7 extending rearwardly therefrom and abutting a shoulder upon the motor casing so that relative rotation between the two casings will be prevented. A driving shaft 8 extends forwardly from the motor and passes into the tool casing 6, being rotatably mounted in a bearing sleeve or bushing 9 which is threaded into the rear end of the tool casing, as clearly shown in Fig. 2. Around the driving shaft and abutting the end of the bushing or bearing sleeve 9 is a ball thrust bearing 10 which is held in place by lock nuts 11 mounted upon the shaft, as shown in Fig. 2. Within the casing 6 is a hammer 12 which is of cylindrical formation and has its forward end closed and adapted to impinge against the stem of a tool 13 which is slidably mounted in a guiding nozzle 14 on the forward end of the tool casing, as will be understood upon reference to Figs. 1 and 2. The cylindrical hammer 12 is free to slide within the casing 6, but is held against relative rotation by a guiding lug 15 engaging in a longitudinal groove 16 in the side of the hammer, as clearly shown in Fig. 2. The lug 15 is formed on the inner end of a threaded stud or set screw 17 which extends outwardly through the casing and is held in place by a nut 18 fitted on its outer end and turned home against the side of the casing, as shown in Figs. 2 and 4. The forward end of the driving shaft extends to a point within the hammer 12 and at its forward extremity is formed with a lateral projection 19, the rear surface 20 of which is inclined so as to have a cam action, as will presently appear. Threaded into the rear open end of the hammer is a sleeve 21 which is provided with a cam surface 22 at its forward extremity presented to the inclined surface 20 of the projection 19 on the driving shaft and it will be seen at once that as the driving shaft rotates the interengagement of the two cam surfaces will effect reciprocation of the sleeve and the hammer in which it is fitted. At diametrically opposite points in the rear edge of the hammer are notches 23 and at corresponding points in the rear edge of the cam sleeve are similar notches 24 which will register with the notches 23 when the cam sleeve is properly turned home, at which time the edges of the sleeve and the hammer will be flush. Mounted upon the driving shaft at the rear of the hammer and the cam sleeve is a thrust plate or washer 25 which is provided upon its forward face with diametrical lugs or ribs 26 adapted to seat in the notches 23 and 24 and thereby prevent relative rotation of the sleeve and the hammer so that the sleeve cannot be accidentally disengaged from the head while the tool is in operation. An expansion spring 27 is disposed about the driving shaft with one end within and bearing against the bearing sleeve or bushing 9 and its opposite end bearing against the thrust plate or washer 25, the spring obviously serving to yieldably hold the hammer in its forward position. The bushing 9 is provided with an opening 28 through its end so that lubricant may be supplied to the interior of the tool and thereby attain thorough lubrication of the reciprocatory head.

From the foregoing description, taken in connection with the accompanying drawings, it is thought the operation of the device will be readily understood. The tool 13 is fitted into the projection or nozzle 14 of the casing 6 so that the rear or upper end of its stem will be in position to receive the impact of the hammer 12, the working end or face of the tool, of course, being set against the work. The rotation of the motor will be imparted directly to the driving shaft 8 and the rotation of said shaft will cause the cam projection or lug 19 to rotate in contact with the cam surface 22 of the cam sleeve 21, and as the high parts of the two cam surfaces aline the sleeve will be forced rearwardly against the tension of the spring 27 while as soon as the high parts of the cam surfaces clear, the spring will immediately expand and drive the sleeve forward. Inasmuch as the sleeve is threaded into the hammer and is locked thereto by the thrust plate 25, the hammer must follow the movements of the sleeve and will be, therefore, drawn from the tool by the action of the cams and then thrust forcibly forward against the tool by the action of the spring. The drawings show only one cam surface upon the cam sleeve and upon the driving shaft but it is obvious that a series of cam surfaces may be provided so that the strokes of the hammer and consequently of the tool will be made more rapid but, whether there be one or a plurality of interengaging cam surfaces, the action is the same as the cams work against the spring and the spring drives the hammer forward to impinge upon the tool. It will be noted that the structure is very simple and compact and not apt to get out of order. The thrust of the motor is absorbed by the thrust bearing 10 so that the shaft will rotate readily and without perceptible distortion while it will operate positively and effectively to reciprocate the hammer. To prevent possible lateral oscillation of the shaft, a stop collar 29 is secured thereon to bear against the inner end surface of the bushing or bearing sleeve.

Having thus described the invention, I claim:

A tool of the character described comprising a casing, a cylindrical hammer disposed within the casing in position to impinge upon the stem of a tool fitted in the end of the casing, a cam sleeve threaded into the rear end of the hammer and having a cam surface upon its forward end, the cam sleeve and the hammer having radial notches in their rear ends adapted to aline when the sleeve is turned home, a driving shaft rotatably mounted in the casing and extending through the sleeve into the hammer, a cam upon the shaft cooperating with the cam surface of the sleeve, a thrust plate fitted loosely upon the shaft and provided on its forward face with radial lugs engaging in the notches in the cam sleeve and the hammer whereby to lock the hammer and the sleeve together, a closure for the end of the casing around the shaft, and an expansion spring disposed within the casing around the shaft between the closure and the thrust plate.

In testimony whereof I affix my signature.

CHARLES KELLER. [L. S.]